United States Patent
Mi

(10) Patent No.: US 10,263,837 B2
(45) Date of Patent: *Apr. 16, 2019

(54) ALARM METHOD FOR MULTI-MODE BASE STATION, MULTI-MODE BASE STATION, AND COMMUNICATION SYSTEM

(71) Applicant: Huawei Technologies Co., Ltd., Shenzhen (CN)

(72) Inventor: Liya Mi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 141 days.

This patent is subject to a terminal disclaimer.

(21) Appl. No.: 15/055,503

(22) Filed: Feb. 26, 2016

(65) Prior Publication Data

US 2016/0183106 A1   Jun. 23, 2016

Related U.S. Application Data

(63) Continuation of application No. 14/221,879, filed on Mar. 21, 2014, now Pat. No. 9,331,898, which is a
(Continued)

(51) Int. Cl.
*H04B 7/00* (2006.01)
*H04L 12/24* (2006.01)
(Continued)

(52) U.S. Cl.
CPC ............ *H04L 41/069* (2013.01); *H04L 41/06* (2013.01); *H04W 24/04* (2013.01); *H04W 24/10* (2013.01); *H04W 88/10* (2013.01)

(58) Field of Classification Search
CPC ...... H04L 41/069; H04L 41/06; H04W 24/04; H04W 24/10; H04W 88/10; H04W 88/12
(Continued)

(56) References Cited

U.S. PATENT DOCUMENTS

| 4,117,479 A | 9/1978 | Galvin et al. |
| 6,253,067 B1 * | 6/2001 | Tsuji ...................... H04B 17/19 455/115.2 |

(Continued)

FOREIGN PATENT DOCUMENTS

| CN | 1863346 A | 11/2006 |
| CN | 101047428 A | 10/2007 |

(Continued)

OTHER PUBLICATIONS

Huawei, "World's First Multi-mode Base Station Controller Launched," Munch, Germany, Jul. 10, 2009, 2 pages.

(Continued)

*Primary Examiner* — Dmitry Levitan
(74) *Attorney, Agent, or Firm* — Slater Matsil, LLP

(57) ABSTRACT

The present invention provides an alarm method for a multi-mode base station. The method includes generating, by the multi-mode base station, alarm information in a first operation mode in a first multi-mode operation mode. The multi-mode base station determines that the alarm information is applicable to all operation modes in the first multi-mode operation mode. The multi-mode base station sends the alarm information as public alarm information of the first multi-mode operation mode to a network management system. The present invention further provides a multi-mode base station and a communication system. The present invention is capable of determining a scope of operation modes related to alarm information generated in the multi-mode base station, which is used to manage the alarm information.

12 Claims, 5 Drawing Sheets

Related U.S. Application Data continuation of application No. PCT/CN2011/079928, filed on Sep. 21, 2011.

(51) Int. Cl.
    *H04W 24/04*     (2009.01)
    *H04W 88/10*     (2009.01)
    *H04W 24/10*     (2009.01)

(58) Field of Classification Search
    USPC .................... 370/310, 328, 349; 455/561, 90
    See application file for complete search history.

(56) References Cited

U.S. PATENT DOCUMENTS

| | | | |
|---|---|---|---|
| 6,256,490 B1 * | 7/2001 | Yost | H04W 24/00 |
| | | | 379/111 |
| 6,535,721 B1 | 3/2003 | Burke et al. | |
| 6,738,645 B2 | 5/2004 | Knight | |
| 7,136,864 B2 | 11/2006 | Jeon | |
| 7,224,170 B2 * | 5/2007 | Graham | H01Q 3/267 |
| | | | 324/522 |
| 8,140,061 B2 | 3/2012 | Ricci | |
| 2001/0041595 A1 * | 11/2001 | Ikeda | H04B 7/0491 |
| | | | 455/562.1 |
| 2004/0162810 A1 | 8/2004 | Jeon | |
| 2011/0256834 A1 | 10/2011 | Dayal et al. | |
| 2012/0266152 A1 | 10/2012 | Tang et al. | |
| 2012/0281587 A1 | 11/2012 | Yang | |
| 2013/0272130 A1 | 10/2013 | Zhang | |
| 2014/0049732 A1 | 2/2014 | Xie et al. | |

FOREIGN PATENT DOCUMENTS

| | | |
|---|---|---|
| CN | 101192948 A | 6/2008 |
| CN | 101193395 A | 6/2008 |
| CN | 101198150 A | 6/2008 |
| CN | 101227708 A | 7/2008 |
| CN | 101242593 A | 8/2008 |
| CN | 101282517 A | 10/2008 |
| CN | 101437259 A | 5/2009 |
| CN | 101727289 A | 6/2010 |
| CN | 101754386 A | 6/2010 |
| CN | 101772056 A | 7/2010 |
| CN | 101778497 A | 7/2010 |
| CN | 101965070 A | 2/2011 |
| CN | 102006628 A | 4/2011 |
| CN | 102026250 A | 4/2011 |
| CN | 102026422 A | 4/2011 |
| CN | 102104997 A | 6/2011 |
| EP | 2273847 A1 | 1/2011 |
| EP | 2296428 A1 | 3/2011 |
| GB | 2452025 A | 2/2009 |
| JP | 2007228495 A | 9/2007 |
| JP | 2013528972 A | 7/2013 |
| JP | 2014531059 A | 11/2014 |
| KR | 100655739 B1 | 12/2006 |
| WO | 2009100411 A2 | 8/2009 |
| WO | 2010075738 A1 | 7/2010 |

OTHER PUBLICATIONS

Mancuso, V., et al., "Reducing Costs and Pollution in Cellular Networks," Energy Efficiency in Communications, IEEE Communications Magazine, vol. 49, No. 8, Aug. 2011, pp. 63-71.

* cited by examiner

ALARM METHOD FOR MULTI-MODE BASE STATION, MULTI-MODE BASE STATION, AND COMMUNICATION SYSTEM

This application is a continuation of U.S. patent application Ser. No. 14/221,879, filed on Mar. 21, 2014, which is a continuation of International Application No. PCT/CN2011/079928, filed on Sep. 21, 2011. The afore-mentioned patent applications are hereby incorporated by reference in their entireties.

TECHNICAL FIELD

Embodiments of the present invention relate to the field of mobile communications technologies, and in particular, to an alarm method for a multi-mode base station, a multi-mode base station, and a communication system.

BACKGROUND

A multi-mode base station is a device into which base station devices in multiple operation modes are integrated. The device can provide radio communication services of multiple operation modes. For example, the multi-mode base station can provide radio communication services in LTE, WCDMA, and GSM modes, or other radio operation modes.

The multi-mode base station is usually the integration of base stations based on single-mode base stations. A single-mode base station is a base station device providing a single operation mode. For example, the single-mode base station may provide radio communication services of any one of the LTE, WCDMA, and GSM modes, or other radio operation modes.

The multiple operation modes provided by the multi-mode base station may share a part of hardware resources or a part of software resources. For example, operation modes provided by the multi-mode base station may share resources such as a fan module, a power supply module, an antenna, or a remote radio unit (RRU) in the multi-mode base station to save costs and facilitate unified management of the multi-mode base station.

Definitely, the multi-mode base station may also separately provide a part of hardware resources or a part of software resources to separately serve each operation mode of the multi-mode base station, and the hardware or software resources used for different operation modes are independent of each other. For example, a network management system or an external service processing module of the multi-mode base station is used for each operation mode separately. The network management system may be located inside the multi-mode base station or located outside the multi-mode base station independently. The external service processing module or network management system serving the operation modes of the multi-mode base station keeps consistent with external service processing modules or network management systems serving operation modes of single-mode base stations in performance.

The network management system serving the operation modes of the multi-mode base station is basically the integration of the network management systems serving the operation modes of the single-mode base stations. In the multi-mode base station, on the one hand, the network management system may be responsible for connecting to a remote management control unit, for example, connecting to a network management server of an operator through an intelligent platform management interface (IPMI). On the other hand, the network management system may also manage the hardware resources or software resources in the operation modes served by the network management system.

Although network management systems serving the operation modes of the multi-mode base station are independent of each other, because the operation modes may share hardware resources or software resources, management of one operation mode by the network management system may relate to management of another operation mode. For example, when the network management system serving an LTE mode of the multi-mode base station upgrades shared hardware resources in the LTE mode, services of another operation mode using the shared hardware resources may be affected. Specifically, in a multi-mode base station that provides both an LTE mode and a GSM mode, when a network management system upgrades shared hardware resources in the LTE mode, shared hardware resources in the GSM mode also need to be upgraded. For another example, the multi-mode base station reports alarm information, status information, or logs to the network management system serving the LTE mode of the multi-mode base station, so that the network management system manages hardware or software resources serving the LTE mode. When the alarm information, status information, or logs relate to the shared hardware resources or shared software resources, the network management system serving the GSM mode also needs to manage the shared hardware resources or shared software resources.

In the prior art, for a multi-mode base station supporting multiple operation modes, no effective mechanism is available for managing alarm information of the multi-mode base station.

SUMMARY

Embodiments of the present invention provide an alarm method for a multi-mode base station, a multi-mode base station, and a communication system, which are used to solve the problem about how to manage alarm information of a multi-mode base station.

One aspect of the present invention provides an alarm method for a multi-mode base station. The method includes generating, by the multi-mode base station, alarm information in a first operation mode in a first multi-mode operation mode. The first multi-mode operation mode includes at least two operation modes, and the first multi-mode operation mode corresponds to a first alarm set. The first alarm set includes alarm information applicable to all operation modes in the first multi-mode operation mode. The method further includes determining, by the multi-mode base station according to the first alarm set, that the alarm information is applicable to all the operation modes in the first multi-mode operation mode. The alarm information is sent, by the multi-mode base station, as public alarm information of the first multi-mode operation mode to a network management system.

Another aspect of the present invention provides a multi-mode base station, which includes a generating unit configured to generate alarm information in a first operation mode in a first multi-mode operation mode. The first multi-mode operation mode includes at least two operation modes, and the first multi-mode operation mode corresponds to a first alarm set. The first alarm set includes alarm information applicable to all operation modes in the first multi-mode operation mode. A determining unit is configured to determine, according to the first alarm set, that the alarm information is applicable to all the operation modes in the first multi-mode operation mode. A sending unit is configured to send the alarm information as public alarm information of the first multi-mode operation mode to a network management system.

Another aspect of the present invention provides a communication system including a multi-mode base station and a network management system. The multi-mode base station is configured to generate alarm information in a first operation mode in a first multi-mode operation mode. The first multi-mode operation mode includes at least two operation modes, and the first multi-mode operation mode corresponds to a first alarm set. The first alarm set includes alarm information applicable to all operation modes in the first multi-mode operation mode. The multi-mode base station is further configured to determine, according to the first alarm set, that the alarm information is applicable to all the operation modes in the first multi-mode operation mode, and send the alarm information as public alarm information of the first multi-mode operation mode to the network management system. The network management system is configured to receive the public alarm information sent by the multi-mode base station.

By using the alarm method for a multi-mode base station, the multi-mode base station, and the communication system according to the present invention, a scope of operation mode related to alarm information generated in the multi-mode base station is determined, and the alarm information is reported to a network management system, so that management of alarm information of the multi-mode base station is implemented.

DETAILED DESCRIPTION OF ILLUSTRATIVE EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Persons skilled in the art may understand that the accompanying drawings show only exemplary embodiments of the present invention and the modules or procedures in the accompanying drawings are not mandatory for the implementation of the present invention.

Figure 1:
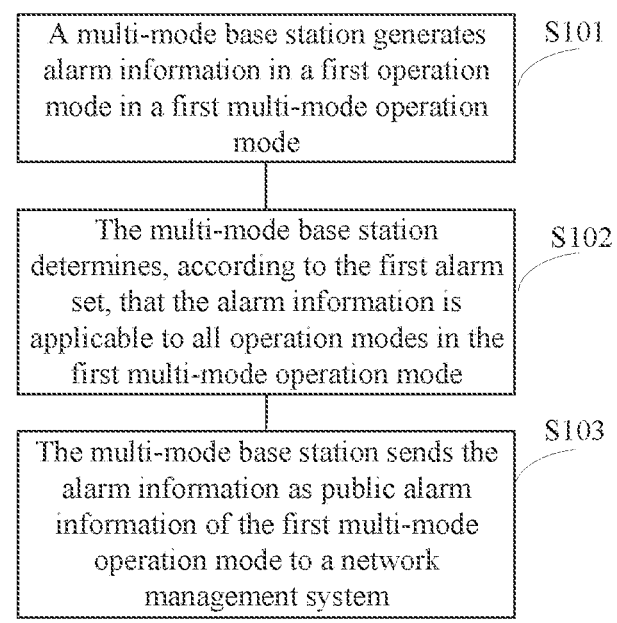
FIG. 1 is a flowchart of an alarm method for a multi-mode base station according to a first embodiment of the present invention.

An alarm method for a multi-mode base station in a first embodiment of the present invention is shown in FIG. 1, and includes the following.

S101. A multi-mode base station generates alarm information in a first operation mode in a first multi-mode operation mode, where the first multi-mode operation mode includes at least two operation modes, and the first multi-mode operation mode corresponds to a first alarm set, where the first alarm set includes alarm information applicable to all operation modes in the first multi-mode operation mode.

S102. The multi-mode base station determines, according to the first alarm set, that the alarm information is applicable to all the operation modes in the first multi-mode operation mode.

S103. The multi-mode base station sends the alarm information as public alarm information of the first multi-mode operation mode to a network management system.

In S101, the alarm information may be an alarm indication generated in the multi-mode base station about some hardware devices or software devices when the hardware devices or the software devices in the multi-mode base station are faulty or need to be maintained. For example, when a fan module serving an LTE mode in the multi-mode base station is faulty and cannot perform normal heat dissipation for the related parts in the LTE mode, the multi-mode base station generates an alarm indication about the fan module. For another example, when an RRU serving a WCDMA mode in the multi-mode base station is faulty and cannot perform normal remote radio transmission in the WCDMA mode, the multi-mode base station generates an alarm indication about the RRU.

In this embodiment, the first multi-mode operation mode is any combination of operation modes in the multi-mode base station. For example, when the LTE mode, the WCDMA mode, and a GSM mode exist in the multi-mode base station, the first multi-mode operation mode may include the LTE mode and the WCDMA mode; or may include the WCDMA mode and the GSM mode; or may include the LTE mode, the WCDMA mode, and the GSM mode. Persons skilled in the art may understand that the operation modes in the first multi-mode operation mode may be all operation modes in the multi-mode base station, or may be several specific operation modes in the multi-mode base station, which is not limited in the present invention.

In this embodiment, the first alarm set may be stored in the multi-mode base station, or may be stored in the network management system. The first alarm set may be an information list in the multi-mode base station. The multi-mode base station collects information of hardware resources or software resources that may be shared by all operation modes in the first multi-mode operation mode, so as to establish and maintain the information list. The information list may include the number of operation modes, names of the operation modes, information of shared hardware resources or software resources corresponding to the operation modes, alarm information that can be shared by hardware resources or software resources, and so on, which is not limited in the present invention.

In this embodiment, when the number of operation modes of the multi-mode base station changes, the multi-mode base station may also update the information list. Specifically, it is assumed that the multi-mode base station has the LTE mode, the GSM mode, and the WCDM mode. When a radio communication service provided by the multi-mode base station changes, the multi-mode base station may switch from the original three operation modes to two operation modes (for example, including only the LTE mode and the GSM mode), but does not have the WCDMA mode. In this case, the multi-mode base station may update the information list according to the change of the operation modes. Persons skilled in the art may understand that the information list may be presented in different forms, for example, exist in the multi-mode base station or in the network management system in the form of an excel, which is not limited in the present invention.

In this embodiment, persons skilled in the art may understand that the multi-mode base station may generate alarm information in different operation modes in the multi-mode base station. For example, the multi-mode base station may generate alarm information in the first operation mode in the first multi-mode operation mode, or the multi-mode base station may generate alarm information in another operation mode in the first multi-mode operation mode, which is not limited in the present invention.

In S102, the public alarm information is alarm information generated by the multi-mode base station when some hardware resources or some software resources that may be shared by the operation modes in the first multi-mode operation mode are faulty or need to be maintained. In this embodiment, the alarm information in the first alarm set may be public alarm information. For example, when a fan module serving the LTE mode in the multi-mode base station is faulty and cannot perform normal heat dissipation for the related parts in the LTE mode, the multi-mode base station generates an alarm indication about the fan module. Because the operation modes in the first multi-mode operation mode may share the fan module, the multi-mode base station may know, according to the first alarm set, that the alarm indication is applicable to all operation modes in the first multi-mode operation mode. For another example, when an RRU serving the WCDMA mode in the multi-mode base station is faulty and cannot perform normal remote radio transmission in the WCDMA mode, the multi-mode base station generates an alarm indication about the RRU. Because the operation modes in the first multi-mode operation mode may share the RRU, the multi-mode base station may also know, according to the first alarm set, that the alarm indication is applicable to all operation modes in the first multi-mode operation mode.

In this embodiment, when the alarm information generated by the multi-mode base station is included in the first alarm set, or the alarm information generated by the multi-mode base station is applicable to all the operation modes in the first multi-mode operation mode, the multi-mode base station may mark the alarm information with a public alarm information identifier as the public alarm information of the first multi-mode operation mode.

In this embodiment, the alarm information marked with the public alarm information identifier may be a field added to data carrying alarm information, or may be an identifier added to data carrying alarm information, where content included in the field and the identifier may be used as a public alarm information identifier.

For example, a field is added to data of alarm information, where data included in the field is "yes" or "no". When the multi-mode base station detects that the alarm information is included in the first alarm set, the multi-mode base station records the data in the field added to the alarm information as "yes", that is, the alarm information is marked with a public alarm information identifier, where the public alarm information identifier indicates that the alarm information is alarm information of all the operation modes in the first multi-mode operation mode, and the alarm information is public alarm information. When the multi-mode base station detects that the alarm information is not included in the first alarm set, the multi-mode base station records the data in the field added to the alarm information as "no", that is, the alarm information is not marked with a public alarm information identifier, and the alarm information is not public alarm information.

For another example, a field is added to data of alarm information, where data included in the field is the operation modes of the multi-mode base station. When the multi-mode base station detects that the alarm information is included in the first alarm set, the multi-mode base station records the operation modes in the first multi-mode operation mode into the data of the field added to the alarm information, that is, the alarm information is marked with a public alarm information identifier, where the public alarm information identifier represents the operation modes in the first multi-mode operation mode. Specifically, it is assumed that operation modes provided by the multi-mode base station are the LTE mode, the WCDMA mode, and the GSM mode, and the first multi-mode operation mode of the multi-mode base station includes the three operation modes: the LTE mode, the WCDMA mode, and the GSM mode. When the multi-mode base station detects that the fan module serving the LTE mode is faulty and needs to be maintained, the multi-mode base station generates alarm information in the LTE mode, and records the data in the field added to the alarm information as the LTE mode, the WCDMA mode, and the GSM mode, so as to indicate that the alarm information is applicable to all the operation modes in the first operation mode and the scope of operation modes related to the public alarm information. When the multi-mode base station detects that the alarm information is not included in the first alarm set or the alarm information is inapplicable to all the operation modes in the first operation mode, the multi-mode base station does not record the operation mode into the data of the field added to the alarm information or records only the first operation mode into the data of the field added to the alarm information, that is, the alarm information is not marked with a public alarm information identifier. Persons skilled in the art may understand that using the alarm information as public alarm information may be implemented in other manners. For example, minor alarm information and public alarm information may be distinguished by marking alarm information not included in the first alarm set but not marking alarm information included in the first alarm set, which is not limited in the present invention.

In S103, when the multi-mode base station generates alarm information in the first operation mode and the alarm information is applicable to all operation modes in the first multi-mode operation mode, the multi-mode base station sends the alarm information marked with the public alarm identifier to the network management system. The network management system may serve all operation modes of the multi-mode base station, or serve the first multi-mode operation mode, or serve only the first operation mode. For example, the network management system serving all operation modes of the multi-mode base station may send the alarm information marked with the public alarm identifier to a network management server remotely connected to the network management system. After receiving the alarm information marked with the public alarm identifier, a network administrator maintaining the network management server obtains the scope of operation modes of the multi-mode base station related to the alarm information, so as to solve the problem carried in the alarm information. This facilitates unified management and maintenance for operation modes of the multi-mode base station, reduces maintenance costs, and improves management efficiency. For another example, the network management system serving the first operation mode may send the alarm information marked with the public alarm identifier to the network management server remotely connected to the network management system. When different operation modes exist in the public alarm identifier, the network administrator may know the scope of the related operation modes according to the alarm information. When the network management system serving the first operation mode solves the problem for the first operation mode and carried in the alarm information, the network management system may further send the alarm information to a network management system serving another operation mode, notifying a network management server connected to the network management system serving another operation mode, and allowing other network administrators to decide whether to maintain or solve, through the network management system serving another operation mode, the problem for another operation mode and carried in the alarm information. This facilitates unified management and maintenance for operation modes of the multi-mode base station, reduces maintenance costs, and improves management efficiency.

In this embodiment, when the multi-mode base station determines, according to the first alarm set, that the alarm information is inapplicable to another operation mode in the first multi-mode operation mode, the multi-mode base station sends the alarm information as the alarm information applicable to the first operation mode to the network management system. For example, when the alarm information generated in the first operation mode is not included in the first alarm set, the multi-mode base station does not mark the alarm information with the public alarm information identifier, but directly sends the alarm information to the network management system, so that the network management system maintains related software resources or hardware resources of the first operation mode.

In this embodiment, when the multi-mode base station switches from the first multi-mode operation mode to a single-mode operation mode, the multi-mode base station sends the alarm information applicable to the single-mode operation mode to the network management system. For example, when the single-mode operation mode is the first operation mode, the multi-mode base station may delete the public alarm identifier on the public alarm information of the first multi-mode operation mode, and send the alarm information with the public alarm identifier deleted, as alarm information of the first operation mode to the network management system. The single-mode operation mode means that only one operation mode exists in the multi-mode base station. For example, when the communication environment provided by the multi-mode base station changes or the multi-mode base station does not need to provide services for another operation mode, the multi-mode base station may have only one operation mode.

In this embodiment, when the multi-mode base station switches from the single-mode operation mode to the first multi-mode operation mode again, the multi-mode base station sends the alarm information applicable to the first multi-mode operation mode as the public alarm information of the first multi-mode operation mode to the network management system. For example, when the alarm information applicable to the single-mode operation mode is also applicable to the first multi-mode operation mode, the multi-mode base station marks the alarm information with a public alarm identifier, and sends the alarm information as public alarm information of the first multi-mode operation mode to the network management system.

Therefore, in this embodiment, the multi-mode base station can determine the scope of the operation modes related to the alarm information generated in the multi-mode base station, and report the alarm information to the network management system, so that the network management system determines, according to the alarm information reported by the multi-mode base station, the scope of the operation modes related to the alarm information. This facilitates unified management and maintenance for operation modes of the multi-mode base station, reduces maintenance costs, and improves management efficiency.

Figure 2:
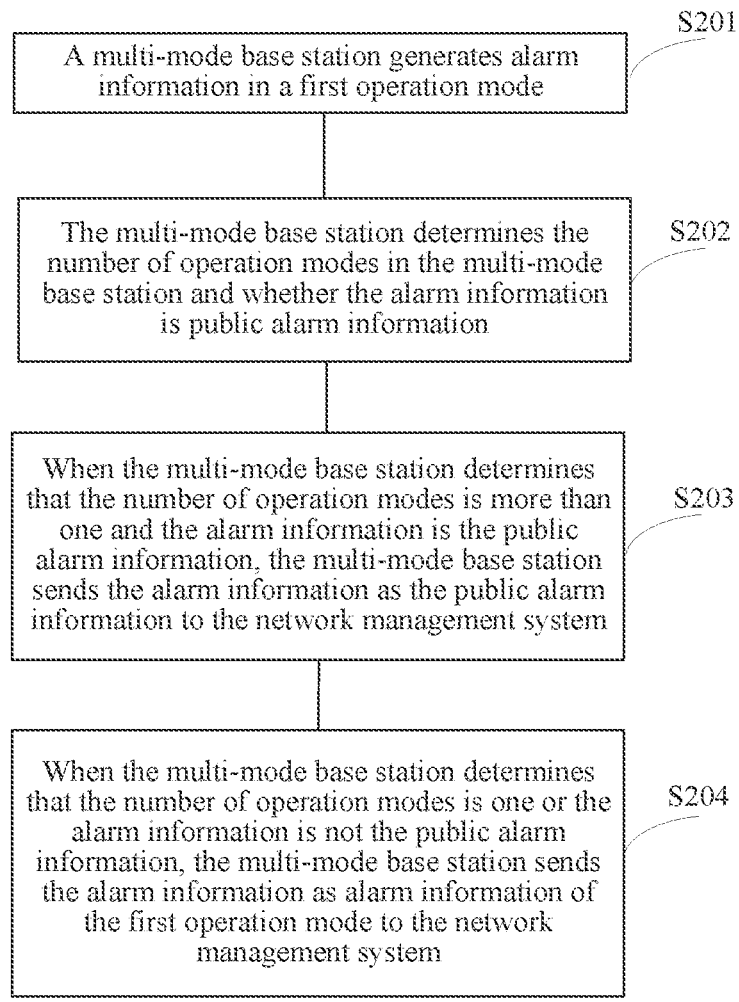
FIG. 2 is a flowchart of an alarm method for a multi-mode base station according to a second embodiment of the present invention.

An alarm method for a multi-mode base station in a second embodiment of the present invention is shown in FIG. 2, and includes the following.

S201. A multi-mode base station generates alarm information in a first operation mode.

S202. The multi-mode base station determines the number of operation modes in the multi-mode base station and whether the alarm information is public alarm information.

S203. When the multi-mode base station determines that the number of operation modes is more than one and the alarm information is the public alarm information, the multi-mode base station sends the alarm information as the public alarm information to the network management system.

S204. When the multi-mode base station determines that the number of operation modes is one or the alarm information is not the public alarm information, the multi-mode base station sends the alarm information as alarm information of the first operation mode to the network management system.

S201 is not further described herein. For details, reference may be made to the related description in S102 in the first embodiment.

In S202, the determining, by the multi-mode base station, the number of operation modes may be determining, by the multi-mode base station, that the operation modes are multiple operation modes or a single operation mode, or may be determining, by the multi-mode base station, the specific scope of the operation modes. For example, the multi-mode base station may determine that the number of operation modes is 2 or may determine that the specific scope of the operation modes is a GSM mode and an LTE mode.

In this embodiment, the determining, by the multi-mode base station, whether the number of operation modes is more than one refers to determining whether the multi-mode base station provides more than one radio communication service. For example, the multi-mode base station determines whether the multi-mode base station needs to provide radio communication services of both the LTE mode and the GSM mode, and the multi-mode base station provides a single operation mode if a determination result is that only the LTE mode needs to be provided by the multi-mode base station according to service requirements. Persons skilled in the art may understand that the above determining method may be obtained by a preset means, which is not limited in the present invention.

In this embodiment, the public alarm information is not further described herein. For details, reference may be made to the related description in the first embodiment.

In S203 and S204, when the multi-mode base station determines that the number of the operation modes is more than one and the alarm information is public alarm information, the multi-mode base station marks the alarm information with a public alarm identifier, and sends the alarm information marked with the public alarm identifier as public alarm information to the network management system. For details about marking the alarm information with the public alarm identifier by the multi-mode base station, reference may be made to the related description in the first embodiment. The determining, by the multi-mode base station, that the number of the operation modes is more than one may be understood as determining, by the multi-mode base station, that the multi-mode base station further has another operation mode, for example, further has a second operation mode. The determining, by the multi-mode base station, that the number of the operation modes is one may be understood as determining, by the multi-mode base station, that the multi-mode base station has no other operation modes, for example, has only the first operation mode. When the multi-mode base station determines that the multi-mode base station has no other operation modes, the multi-mode base station does not mark the alarm information with a public alarm identifier, and sends the alarm information not marked with a public alarm identifier as alarm information of the first operation mode to the network management system.

In this embodiment, no matter whether the alarm information is marked with a public alarm identifier, the multi-mode base station sends the alarm information to the network management system, for connecting to a network management server through the network management system. In this way, a network administrator can visually know a fault or the scope of a faulty operation mode. For example, it is assumed that the multi-mode base station has two operation modes: the LTE mode and the GSM mode. When the multi-mode base station receives alarm information of a fan module serving the GSM mode, because the fan module is a hardware resource shared by the LTE mode and the GSM mode in the multi-mode base station and the number of the operation modes of the multi-mode base station is 2, the multi-mode base station marks the alarm information with a public alarm information identifier, and sends the alarm information marked with the public alarm information identifier to the network management system serving the GSM mode, or sends the alarm information to the network management system serving both the LTE mode and the GSM mode. For another example, the multi-mode base station receives alarm information of a CPU serving the GSM mode. Because the CPU is not a hardware resource shared by the LTE mode and the GSM mode in the multi-mode base station, although the number of the operation modes of the multi-mode base station is 2, the multi-mode base station does not mark the alarm information with a public alarm information identifier, and sends the alarm information not marked with a public alarm information identifier to the network management system serving the GSM mode, or sends the alarm information to the network management system serving both the LTE mode and the GSM mode. For another example, when the operation mode of the multi-mode base station switches from the original LTE mode and GSM mode to only the LTE mode, the multi-mode base station receives alarm information of the fan module serving the LTE mode. Although the fan module is a hardware resource shared by the LTE mode and the GSM mode in the multi-mode base station, the number of the operation modes of the multi-mode base station is 1. Therefore, the multi-mode base station does not mark the alarm information with a public alarm information identifier, and sends the alarm information not marked with a public alarm information identifier to the network management system serving the LTE mode, or sends the alarm information to the network management system serving both the LTE mode and the GSM mode.

Therefore, in this embodiment, the multi-mode base station can determine the scope of the operation modes related to the alarm information generated in the multi-mode base station, and report the alarm information to the network management system, so that the network management system determines, according to the alarm information reported by the multi-mode base station, the scope of the operation modes related to the alarm information.

Figure 3:
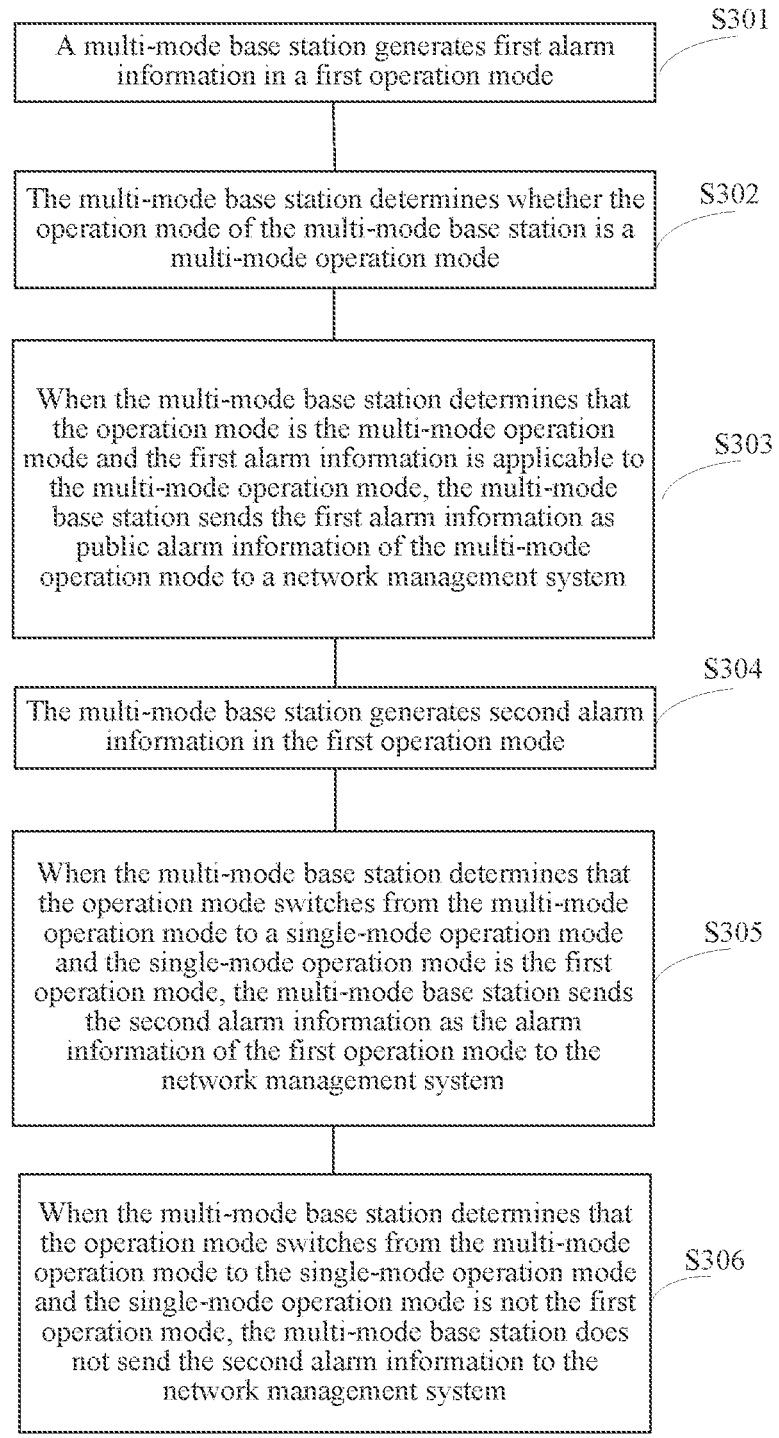
FIG. 3 is a flowchart of an alarm method for a multi-mode base station according to a third embodiment of the present invention.

An alarm method for a multi-mode base station in a third embodiment of the present invention is shown in FIG. 3, and includes the following.

S301. A multi-mode base station generates first alarm information in a first operation mode.

S302. The multi-mode base station determines whether the operation mode of the multi-mode base station is a multi-mode operation mode.

S303. When the multi-mode base station determines that the operation mode is the multi-mode operation mode and the first alarm information is applicable to the multi-mode operation mode, the multi-mode base station sends the first alarm information as public alarm information of the multi-mode operation mode to a network management system.

S304. The multi-mode base station generates second alarm information in the first operation mode.

S305. When the multi-mode base station determines that the operation mode switches from the multi-mode operation mode to a single-mode operation mode and the single-mode operation mode is the first operation mode, the multi-mode base station sends the second alarm information as the alarm information of the first operation mode to the network management system.

S306. When the multi-mode base station determines that the operation mode switches from the multi-mode operation mode to the single-mode operation mode and the single-mode operation mode is not the first operation mode, the multi-mode base station does not send the second alarm information to the network management system.

In this embodiment, S301 and S304 are not further described herein. For details, reference may be made to the related description in S201 in the second embodiment.

In S302, the multi-mode operation mode means that more than one operation mode is provided in the multi-mode base station. For example, when the multi-mode base station needs to provide multiple communication environments or needs to provide services for multiple operation modes, the multi-mode base station may have multiple operation modes. For example, the multi-mode base station may provide both the LTE mode and the GSM mode.

In S303, when the multi-mode base station detects more than one operation mode and detects that the alarm information is applicable to the multi-mode operation mode, the multi-mode base station may mark the first alarm information with a public alarm identifier, and send the first alarm information marked with the public alarm identifier as public alarm information of the multi-mode operation mode to the corresponding network management system. The above method is not further described herein. For details, reference may be made to the related description in S102 in the first embodiment and S203 in the second embodiment.

In S305, the single-mode operation mode means that only one operation mode exists in the multi-mode base station. For example, when the communication environment provided by the multi-mode base station changes or the multi-mode base station does not need to provide services for another operation mode, the multi-mode base station may have only one operation mode.

In this embodiment, when the multi-mode base station switches from the multi-mode operation mode to the single-mode operation mode, the multi-mode base station does not need to maintain or monitor hardware resources or software resources in another operation mode any longer but only needs to maintain or monitor hardware resources or software resources in the single-mode operation mode. In this case, the multi-mode base station may not mark the second alarm information with the public alarm identifier, and send the second alarm information not carrying the public alarm identifier to the network management system. For example, it is assumed that the multi-mode base station has an LTE mode and a GSM mode, and the multi-mode base station obtains alarm information about a fan module serving the LTE mode. When the operation mode of the multi-mode base station changes, assuming that the multi-mode base station has the LTE mode but does not have the GSM mode, the multi-mode base station sends the alarm information as the alarm information of the LTE mode to the network management system.

In this embodiment, when the multi-mode base station switches from the multi-mode operation mode to the single-mode operation mode and the single-mode operation mode is the first operation mode, the multi-mode base station may also cancel the public alarm identifier on the first alarm information serving as the public alarm information, and send the first alarm information as the alarm information of the first operation mode to the network management system.

In S306, when the multi-mode base station determines that the single-mode operation mode is not the first operation mode, the multi-mode base station cancels sending of the second alarm information. For example, it is assumed that the multi-mode base station has an LTE mode and a GSM mode, and the multi-mode base station obtains alarm information about a fan module serving the LTE mode. When the operation mode of the multi-mode base station changes, assuming that the multi-mode base station has the LTE mode but does not have the GSM mode, the multi-mode base station cancels sending of the alarm information of the LTE mode to the network management system.

Therefore, in this embodiment, the multi-mode base station can determine the scope of the operation modes related to the alarm information generated in the multi-mode base station, and report the alarm information to the network management system, so that the network management system determines, according to the alarm information reported by the multi-mode base station, the scope of the operation modes related to the alarm information.

Figure 4:
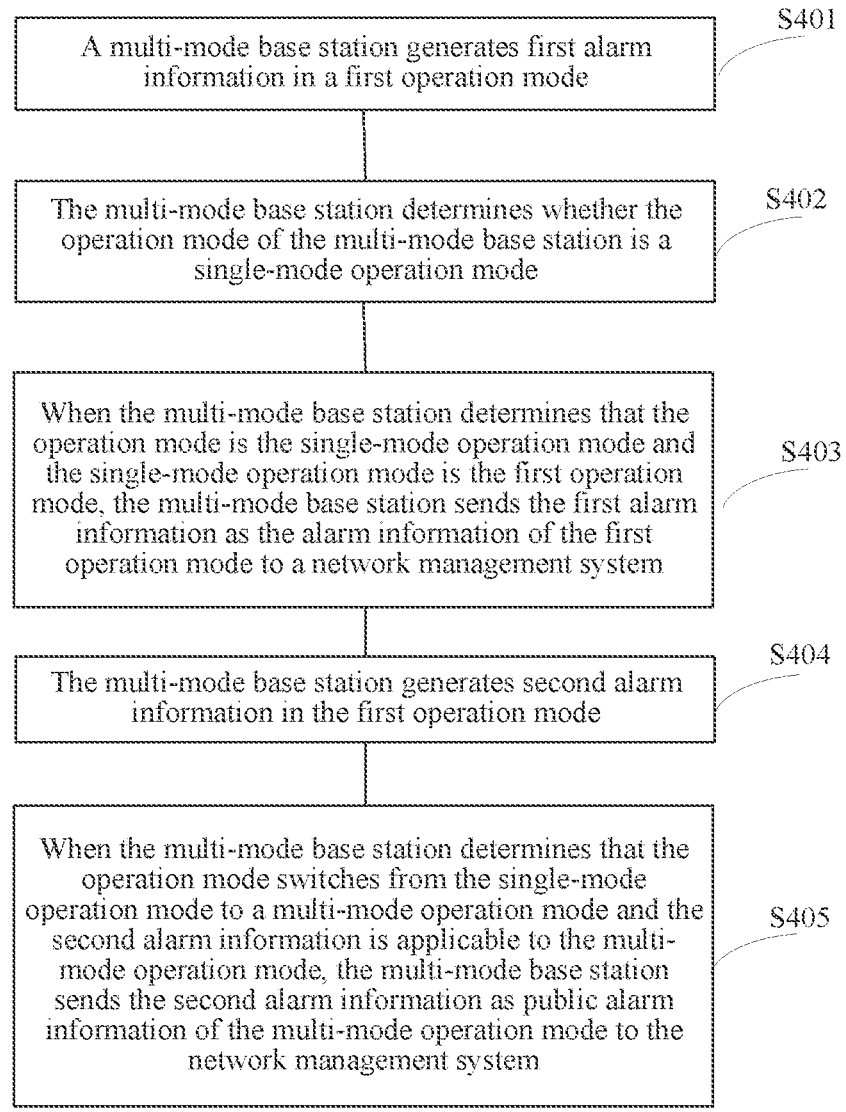
FIG. 4 is a flowchart of an alarm method for a multi-mode base station according to a fourth embodiment of the present invention.

An alarm method for a multi-mode base station in a fourth embodiment of the present invention is shown in FIG. 4, and includes the following.

S401. A multi-mode base station generates first alarm information in a first operation mode.

S402. The multi-mode base station determines whether the operation mode of the multi-mode base station is a single-mode operation mode.

S403. When the multi-mode base station determines that the operation mode is the single-mode operation mode and the single-mode operation mode is the first operation mode, the multi-mode base station sends the first alarm information as the alarm information of the first operation mode to a network management system.

S404. The multi-mode base station generates second alarm information in the first operation mode.

S405. When the multi-mode base station determines that the operation mode switches from the single-mode operation mode to a multi-mode operation mode and the second alarm information is applicable to the multi-mode operation mode, the multi-mode base station sends the second alarm information as public alarm information of the multi-mode operation mode to the network management system.

S401 and S404 of this embodiment are not further described herein. For details, reference may be made to S201 in the second embodiment.

In S402, the single-mode operation mode means that only one operation mode is provided in the multi-mode base station. For example, when the multi-mode base station needs to provide services for only one operation mode according to communication environments, the multi-mode base station may have the single-mode operation mode.

In S403, when the multi-mode base station detects only one operation mode, the multi-mode base station does not mark the first alarm information with the public alarm identifier, but directly sends the first alarm information as the alarm information of the first operation mode to the network management system, so as to notify the alarm information to a network management server remotely connected to the network management system. The specific method is not further described herein. For details, reference may be made to the related description of the third embodiment.

In S405, when the multi-mode base station switches from the single-mode operation mode to the multi-mode operation mode and the second alarm information is applicable to the multi-mode operation mode, because it is necessary to maintain or monitor hardware resources or software resources in another operation mode, the multi-mode base station may mark the second alarm information with a public alarm identifier, and send the second alarm information marked with the public alarm identifier as the public alarm information to the network management system. Persons skilled in the art may understand that reference may be made to the related description in S102 of the first embodiment for marking the alarm information with the public alarm identifier. Details are omitted herein.

In this embodiment, the second alarm information may also be generated in the single-mode operation mode. When the second alarm information is generated in the single-mode operation mode and the second alarm information is applicable to the multi-mode operation mode, the multi-mode base station sends the second alarm information as the public alarm information of the multi-mode operation mode to the network management system.

Therefore, in this embodiment, the multi-mode base station can determine the scope of the operation modes related to the alarm information generated in the multi-mode base station, and report the alarm information to the network management system, so that the network management system determines, according to the alarm information reported by the multi-mode base station, the scope of the operation modes related to the alarm information.

Persons skilled in the art may understand that all or a part of the procedures in the methods of the embodiments can be implemented by hardware under the instruction of a program. The program may be stored in a computer readable storage medium and when the program is executed, the procedures in the methods of the embodiments are executed. The storage medium may be any medium that can store program code, such as a ROM, a RAM, a magnetic disk, or an optical disc.

Figure 5:
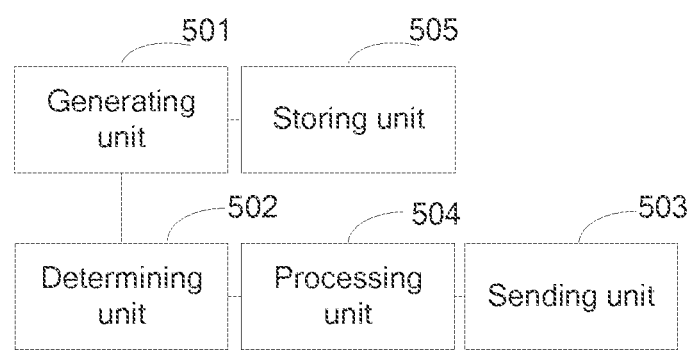
FIG. 5 is a schematic structural diagram of a multi-mode base station according to a fifth embodiment of the present invention.

As shown in FIG. 5, a fifth embodiment of the present invention provides a multi-mode base station. A main structure of the multi-mode base station is shown in FIG. 5, and includes a generating unit 501 configured to generate alarm information in a first operation mode in a first multi-mode operation mode. The first multi-mode operation mode includes at least two operation modes, and the first multi-mode operation mode corresponds to a first alarm set. The first alarm set includes alarm information applicable to all operation modes in the first multi-mode operation mode.

A determining unit 502 is configured to determine, according to the first alarm set, that the alarm information is applicable to all the operation modes in the first multi-mode operation mode. A sending unit 503 is configured to send the alarm information as public alarm information of the first multi-mode operation mode to a network management system.

The determining unit 502 is further configured to determine, according to the first alarm set, that the alarm information is inapplicable to another operation mode in the first multi-mode operation mode. The sending unit 503 is further configured to send the alarm information as the alarm information applicable to the first operation mode to the network management system.

The multi-mode base station further includes a processing unit 504 configured to mark the alarm information with a public alarm identifier of the first multi-mode operation mode.

The sending unit 503 is further configured to send the alarm information marked with the public alarm identifier of the first multi-mode operation mode to the network management system.

The sending unit 503 is further configured for the multi-mode base station to: when the multi-mode base station switches from the first multi-mode operation mode to a single-mode operation mode, and the single-mode operation mode is the first operation mode, send the alarm information applicable to the single-mode operation mode to the network management system.

The sending unit 503 is further configured for the multi-mode base station to: when the multi-mode base station switches from the single-mode operation mode to the first multi-mode operation mode, send the alarm information that is generated in the single-mode operation mode and applicable to the first multi-mode operation mode as the public alarm information of the first multi-mode operation mode to the network management system.

The multi-mode base station further includes a storing unit 505, configured to store the first alarm set.

The multi-mode base station in this embodiment is used to implement the actions executed by the multi-mode base station in the alarm method for the multi-mode base station. For example, the generating unit 501 is configured to execute the action of S101 in the first embodiment, and the sending unit 503 is configured to execute the action of S103 in the first embodiment.

Therefore, in this embodiment, the multi-mode base station can determine the scope of the operation modes related to the alarm information generated in the multi-mode base station, and report the alarm information to the network management system, so that the network management system determines, according to the alarm information reported by the multi-mode base station, the scope of the operation modes related to the alarm information.

Figure 6:
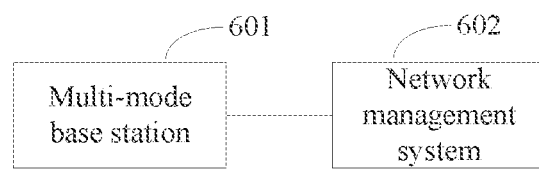
FIG. 6 is a schematic structural diagram of a communication system according to a sixth embodiment of the present invention.

As shown in FIG. 6, a sixth embodiment of the present invention provides a communication system. A main structure of the communication system is shown in FIG. 6, and includes a multi-mode base station 601 and a network management system 602. The multi-mode base station 601 is configured to generate alarm information in a first operation mode in a first multi-mode operation mode. The first multi-mode operation mode includes at least two operation modes, and the first multi-mode operation mode corresponds to a first alarm set. The first alarm set includes alarm information applicable to all operation modes in the first multi-mode operation mode, and the multi-mode base station is further configured to determine, according to the first alarm set, that the alarm information is applicable to all the operation modes in the first multi-mode operation mode, and send the alarm information as public alarm information of the first multi-mode operation mode to the network management system. The network management system 602 is configured to receive the public alarm information sent by the multi-mode base station.

The multi-mode base station 601 is further configured to store the first alarm set.

The network management system 601 is further configured to store the first alarm set.

The multi-mode base station 601 is further configured to determine, according to the first alarm set, that the alarm information is inapplicable to another operation mode in the first multi-mode operation mode, and send the alarm information as the alarm information applicable to the first operation mode to the network management system.

The multi-mode base station 601 is further configured to mark the alarm information with a public alarm identifier of the first multi-mode operation mode, and send the alarm information marked with the public alarm identifier of the first multi-mode operation mode to the network management system.

When the multi-mode base station 601 switches from the first multi-mode operation mode to a single-mode operation mode, and the single-mode operation mode is the first operation mode, the multi-mode base station 601 is further configured to send the alarm information applicable to the single-mode operation mode to the network management system.

When the multi-mode base station 601 switches from the single-mode operation mode to the first multi-mode operation mode, the multi-mode base station 601 is further configured to send the alarm information that is generated in the single-mode operation mode and applicable to the first multi-mode operation mode as the public alarm information of the first multi-mode operation mode to the network management system.

The communication system in this embodiment is used to implement the actions executed by the multi-mode base station and network management system in the alarm method for the operation mode of the multi-mode base station. For example, the multi-mode base station 601 may be used to execute the actions of S101 and S102 in the first embodiment.

Therefore, this embodiment may be used for the multi-mode base station to report alarm information to the network management system. The network management system determines, according to the reported alarm information, a scope of operation modes related to the alarm information. This facilitates unified management and maintenance for operation modes of the multi-mode base station, reduces maintenance costs, and improves management efficiency.

Persons skilled in the art may understand the modules of the apparatuses in the embodiments may be disposed in the apparatuses as described in the embodiments or disposed in one or more apparatuses other than the apparatuses in the embodiments. The modules according to the above embodiments may be combined into one module, or split into multiple submodules.

Persons skilled in the art may understand that the modules of the apparatuses according to the embodiments of the present invention are divided by functions, and in practice, the functional modules may be split or combined for the specific structure.

The sequence numbers of the above embodiments are used for description only and do not represent merits or demerits of the embodiments.

The technical solutions disclosed in the claims also fall within the protection scope of the embodiments of the present invention.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, as long as such modifications or replacements do not cause the essence of corresponding technical solution to depart from the spirit and scope of the technical solutions of the embodiments of the present invention.

What is claimed is:

1. An alarm method comprising:
generating, by a base station, first alarm information in a first operation mode; wherein the first operation mode is any one of the multiple operation modes provided by the base station, and the multiple operation modes respectively provide radio communication services;
obtaining, by the base station, an alarm list comprising a list of alarm information applicable to all the multiple operation modes provided by the base station;
determining the first alarm information is applicable to all the multiple operation modes provided by the base station when the first alarm information is listed in the alarm list; and
sending, by the base station, the first alarm information marked with a public alarm identifier to a management entity in response to determining that the following conditions are met:
multiple operation modes are provided by the base station, and
the first alarm information is applicable to all the multiple operation modes, wherein the public alarm identifier indicates that the first alarm information is to be treated as alert information applicable to all the multiple operation modes.

2. The method according to claim 1, further comprising:
sending, by the base station, the first alarm information as alarm information only applicable to the first operation mode to the management entity in response to determining that the first alarm information is not applicable to all other operation modes of the multiple operation modes other than the first operation mode.

3. The method according to claim 1, further comprising:
sending, by the base station, the first alarm information as alarm information only applicable to the first operation mode to the management entity in response to determining that only a single operation mode is provided by the base station, wherein the single operation mode is the first operation mode.

4. The method according to claim 1, wherein the alarm list is generated by the base station or stored in the management entity.

5. The method according to claim 1, wherein the management entity is a network management system.

6. The method according to claim 1, further comprising:
determining that the first alarm information is not applicable to all other operation modes of the multiple operation modes other than the first operation mode when the first alarm information is not listed in the alarm list;
sending, by the base station, the first alarm information as alarm information only applicable to the first operation mode to the management entity in response to determining that the number of operation modes is more than one.

7. The method according to claim 1, further comprising:
sending, by the base station, the first alarm information as alarm information only applicable to the first operation mode to the management entity in response to determining that the number of operation modes is not more than one so that only a single operation mode is provided, wherein the single operation mode is the first operation mode.

8. A base station comprising:
a processor;
a memory storing a program to be executed in the processor, the program comprising instructions for:
generating first alarm information in a first operation mode;
obtaining an alarm list comprising a list of alarm information applicable to all the multiple operation modes provided by the base station;
determining the first alarm information is applicable to all the multiple operation modes provided by the base station when the first alarm information is listed in the alarm list; and
a transmitter configured to send the first alarm information marked with a public alarm identifier to a management entity in response to determining that that the following conditions are met:
multiple operation modes are provided by the base station, and
the first alarm information is applicable to all the multiple operation modes, wherein the public alarm identifier indicates that the first alarm information is to be treated as alert information applicable to all the multiple operation modes.

9. The base station according to claim 8, wherein the transmitter is further configured to send the first alarm information as alarm information only applicable to the first operation mode to the management entity in response to determining that the first alarm information is not applicable to all other operation modes other than the first operation mode.

10. The base station according to claim 8, wherein the transmitter is further configured to send the first alarm information as alarm information only applicable to the first operation mode to the management entity in response to determining that only a single operation mode is provided by the base station, wherein the single operation mode is the first operation mode.

11. The base station according to claim 8, wherein the alarm list is generated by the processor of the base station or stored in the management entity.

12. An alarm method comprising:
- determining, by a base station, a number of operation modes provided by the base station; and wherein the operation modes respectively provide radio communication services;
- obtaining, by the base station, an alarm list comprising a list of alarm information applicable to all the operation modes;
- generating, by the base station, first alarm information in a first operation mode, wherein the first operation mode is any one of the operation modes;
- determining that the first alarm information is applicable to all the operation modes when the first alarm information is listed in the alarm list;
- sending, by the base station, the first alarm information marked with an alarm identifier to a management entity in response to determining that the number of operation modes is more than one.

* * * * *